United States Patent
Gray et al.

(10) Patent No.: US 6,690,160 B2
(45) Date of Patent: Feb. 10, 2004

(54) POSITION SENSING APPARATUS

(75) Inventors: Keith Wayland Gray, Denver, IA (US); Walter Craig Wright, Waterloo, IA (US); Dale Killen, Port Byron, IL (US)

(73) Assignee: Deere & Company, Moline, IL (US)

( * ) Notice: Subject to any disclaimer, the term of this patent is extended or adjusted under 35 U.S.C. 154(b) by 44 days.

(21) Appl. No.: 10/127,785

(22) Filed: Apr. 22, 2002

(65) Prior Publication Data

US 2003/0197504 A1 Oct. 23, 2003

(51) Int. Cl.$^7$ .................................................. G01B 7/14
(52) U.S. Cl. ............................. 324/207.24; 324/207.13; 324/232
(58) Field of Search ........................ 324/207.13, 207.2, 324/207.21, 207.24, 232

(56) References Cited

U.S. PATENT DOCUMENTS

| | | | |
|---|---|---|---|
| 3,502,966 A | 3/1970 | Perets et al. .................. 324/34 |
| 3,710,687 A | 1/1973 | Rench ....................... 91/363 R |
| 4,588,953 A | 5/1986 | Krage ........................ 324/58.5 |
| 5,103,172 A | 4/1992 | Stoll ............................ 324/226 |
| 5,115,195 A | 5/1992 | Peterson et al. ........ 324/207.13 |
| 5,201,838 A | 4/1993 | Roudaut ....................... 294/88 |
| 5,216,364 A | * 6/1993 | Ko et al. ................ 324/207.24 |
| 5,359,288 A | 10/1994 | Riggs et al. ........... 324/207.22 |
| 5,608,317 A | 3/1997 | Hollmann ................. 324/207.2 |
| 5,670,876 A | * 9/1997 | Dilger et al. .......... 324/207.13 |
| 5,742,161 A | 4/1998 | Karte .................... 324/207.16 |
| 5,952,823 A | 9/1999 | Nyce et al. ............ 324/207.13 |
| 5,998,991 A | * 12/1999 | Begin ..................... 324/207.13 |
| 6,018,241 A | * 1/2000 | White et al. ............. 324/207.2 |
| 6,175,233 B1 | * 1/2001 | McCurley et al. ....... 324/207.2 |
| 6,211,794 B1 | 4/2001 | DeSoto .................... 340/686.1 |
| 6,215,299 B1 | 4/2001 | Reynolds et al. ......... 324/207.2 |
| 6,253,460 B1 | 7/2001 | Schmitz ....................... 33/706 |
| 2001/0035749 A1 | 11/2001 | Nekado ................. 324/207.15 |
| 2001/0038281 A1 | * 11/2001 | Nyce et al. ............ 324/207.13 |
| 2001/0052771 A1 | 12/2001 | Jagiella ................. 324/207.16 |

FOREIGN PATENT DOCUMENTS

| | | | |
|---|---|---|---|
| GB | 2 108 678 A | 5/1983 | |
| WO | WO 9211510 A1 | * 7/1992 | ........... F15B/15/28 |

* cited by examiner

Primary Examiner—N. Le
Assistant Examiner—Darrell Kinder

(57) ABSTRACT

A cylinder position sensing system includes a cylinder housing which slidably receives a rod or shaft element. The cylinder housing has an end piece which slidably receives the shaft element. A first axial groove is formed in the shaft element, and a first magnet member is mounted in the first groove. A second helical groove is formed in the shaft element and is spaced apart from the first groove. A second magnet member is mounted in the second groove. A magnetic field sensor is mounted in the cylinder housing so that the sensor generates an output signal as a function of a relative distance between the first and second magnet members as the second element moves with respect to the first element. Preferably, the shaft element includes a central cylindrical shaft and a hollow cylindrical sleeve mounted over and receiving the shaft. Preferably, the first and second grooves are formed in an inner surface of the sleeve, and the sleeve and the end piece are formed of nonferrous material.

16 Claims, 1 Drawing Sheet

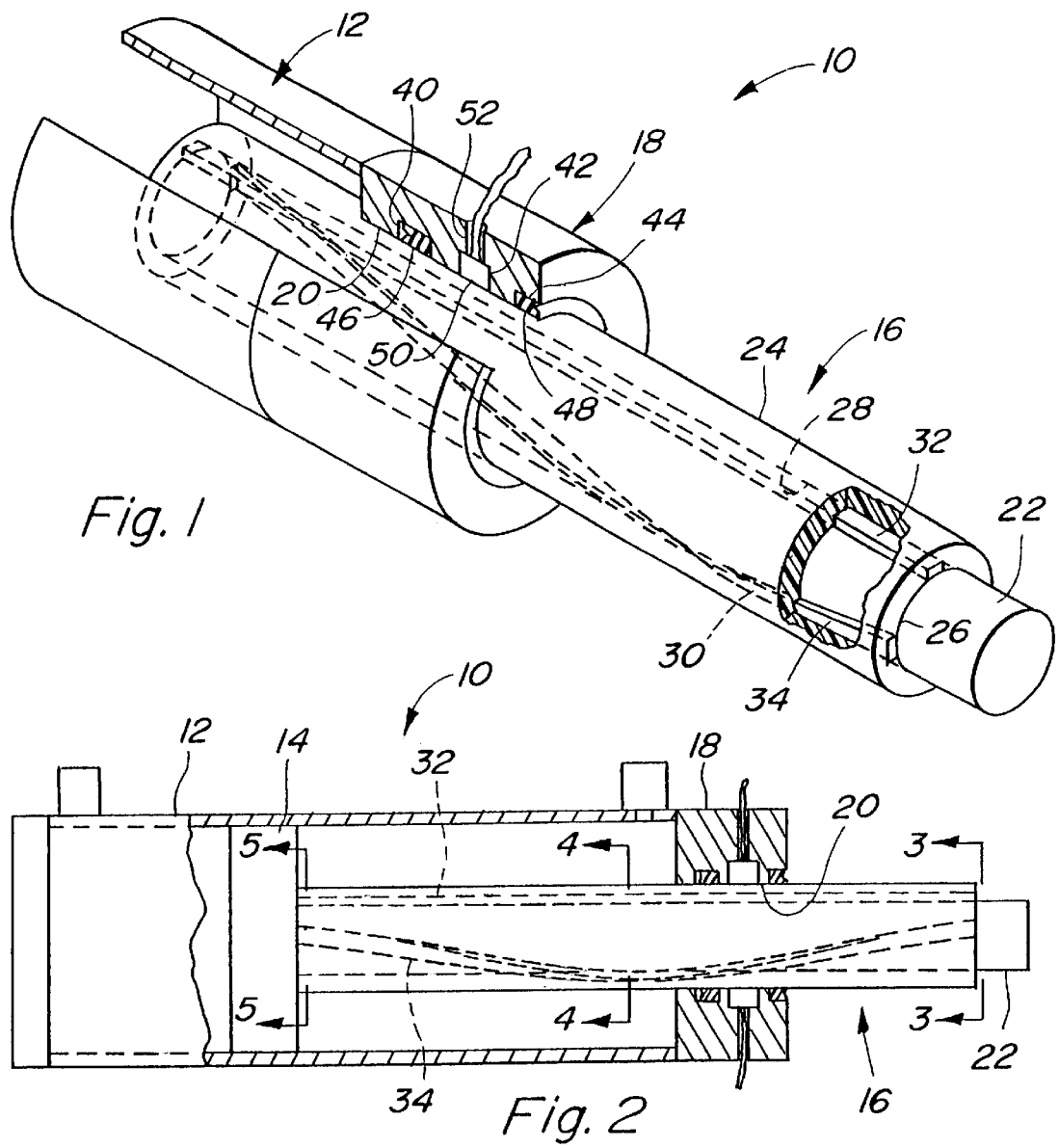
Fig. 1
Fig. 2
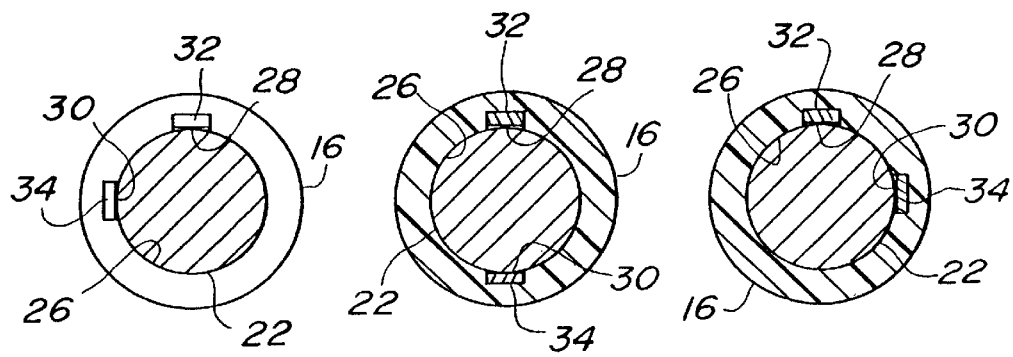
Fig. 3   Fig. 4   Fig. 5

POSITION SENSING APPARATUS

FIELD OF THE INVENTION

The present invention relates to a position sensing apparatus, and more particularly, to a position sensing piston/cylinder assembly.

BACKGROUND OF THE INVENTION

Cylinder position sensing devices are known using various technologies. For example, an integrated sensor, such as a magnetostrictive type sensor (made by sold by MTS Systems Corporation and others), has been attached to an end of a cylinder and inserted into a bore in the rod. This sensor has fixed and moving parts within the rod. This requires a rather large hole to be bored in the rod and some means of fixing the sensing electronics on the end of the cylinder, as well as and means to transmit signals out from the barrel. Such sensors work primarily only with single ended rods. U.S. Pat. No. 5,115,195 describes a design using a short MTS magnetostrictive sensor with multiple magnets for measuring position of a moving body relative to a fixed body. However, it would be difficult and costly to incorporate such a sensor and magnets in a hydraulic cylinder.

U.S. Pat. No. 5,539,993 describes a system wherein a bar-code is placed on the outer surface of the rod and the position is determined with an appropriate bar code reader. It is also known to machine grooves into the outer surface of a cylinder rod, chrome plate over the grooves and then "count" the number of grooves to determine position. This method can determine travel, but not absolute position in the event of cylinder drift in a non-powered state.

Certain cylinder position sensing devices include a linear Hall Effect sensor. But, typically, the Hall Effect sensor is not integrated into the cylinder. U.S. Pat. No. 5,201,838 describes a cylinder position sensing device using a pair of Hall Effect sensors and a single permanent magnet is mounted on a face of the piston head. However, such a design requires a very strong magnet and is likely to work only for a small cylinder with a limited stroke. UK patent GB 2108678 describes a design with a Hall Effect sensor and a magnet mounted outside of a piston cylinder housing which receives a stepped diameter member. However, this design requires a stepped diameter member and can only detect discrete positions corresponding to the different diameter portions of the member.

U.S. Pat. No. 6,253,460 describes a position sensing cylinder design which includes a tapered piston rod which is coated with a non-ferrous material. The sensor detects the distance from the sensor to the tapered rod through the non-ferrous coating. Such a design is difficult to manufacture because it is difficult and time consuming to apply such a non-ferrous coating to a tapered rod, and the outer surface of the coating must be uniform to assure a good seal. Also, the non-ferrous material must be hard enough to meet strength and load requirements, and it may be difficult to obtain a coating which is strong, yet pliable enough in order to build up the rod. Finally, with this design, debris or contaminants between the coating and the sensor may cause inaccurate readings.

U.S. Pat. No. 5,359,288 discloses a position detecting apparatus with a magnetic medium mounted on a movable member and a magnetic field sensor, such as a Hall cell, mounted on a fixed member. The magnetic medium has different areas with different polarities. However, it appears that such a design would yield inaccurate measurements if the movable member moves transverse to its axial dimension, and therefore such a design would not function accurately in a hydraulic cylinder where the rod may rotate or move perpendicular to its normal direction of travel.

SUMMARY OF THE INVENTION

Accordingly, an object of this invention is to provide a compact, robust and accurate cylinder position sensing assembly.

Another object of the invention is to provide such a cylinder position sensing assembly which accurately determines cylinder piston/rod position despite movement of the piston rod in multiple directions.

Another object of the invention is to provide such a cylinder position sensing assembly which accurately determines cylinder piston/rod position despite rotation of the piston rod relative to the cylinder housing.

A further object of the invention is to provide such a cylinder position sensing assembly wherein a hole need not be bored in the rod and wherein the sensor is located outside of the pressurized chamber of the cylinder.

These and other objects are achieved by the present invention, wherein a cylinder position sensing system includes a cylinder housing which slidably receives a piston with a rod or shaft element. The cylinder housing has an annular end piece which slidably receives the rod. First and second magnet members are mounted on or in the rod. The second magnet member is spaced apart from the first magnet member, and the spacing therebetween varies as a function of the axial position along the rod.

Preferably, a first axial groove is formed in the shaft element, and the first magnet member is mounted in the first groove. A second helical groove is formed in the shaft element and is spaced apart from the first groove. The second magnet member is mounted in the second groove. A magnetic field sensor is mounted in the cylinder housing so that the sensor generates an output signal as a function of a relative distance between the first and second magnet members as the second element moves with respect to the first element. Preferably, the rod includes a central cylindrical shaft and a hollow cylindrical sleeve mounted over and receiving the shaft. Preferably, the first and second grooves are formed in an inner surface of the sleeve, and the sleeve and the end piece are formed of non-ferrous material.

BRIEF DESCRIPTION OF THE DRAWINGS

FIG. 1 is a perspective view of an alternate embodiment of the present invention with portions removed.

FIG. 2 is a sectional side view of the position sensing cylinder assembly of FIG. 1;

FIG. 3 is a view taken along lines 3—3 of FIG. 2;

FIG. 4 is a view taken along lines 4—4 of FIG. 2;

FIG. 5 is a view taken along lines 5—5 of FIG. 2.

DETAILED DESCRIPTION

Referring to FIGS. 1 and 2, the position sensing cylinder assembly 10 includes a cylinder housing 12 which slidably receives a piston 14 attached to an end of a rod or shaft assembly 16. The housing 12 forms an end piece 18 which has a central bore 20 which slidably receives the rod assembly 16.

The rod assembly 16 includes a base or central rod 22 and a non-ferrous hollow cylindrical sleeve 24 with a central bore 26 which receives the rod 22. First and second grooves 28 and 30 are formed in the surface of bore 26 so that the separation between grooves 28 and 30 varies as a function of the axial position along rod 22. The first groove 28 may extend axially in the surface of bore 26 and be parallel to a central axis of the rod 22. The second groove 30 may have a helical shape.

A first magnet member 32 is mounted in the first groove 28 and preferably has north and south poles oriented in a radial direction. A second magnet member 34 is mounted in the second groove 30 and preferably also has north and south poles oriented in a radial direction. Alternatively, the grooves could be formed in an outer surface of the rod 22.

Annular grooves 40, 42 and 44 are formed in and axially spaced apart in the surface of bore 20 in end piece 18. A high pressure seal 46 is mounted in groove 40 and sealingly engages the outer surface of sleeve 24. A wiper seal 48 is mounted in grove 44 and sealingly engages the outer surface of sleeve 24.

A sensor 50, such as a magnetostrictive sensor, is mounted in groove 42. Sensor 50 may be a single annular shaped magnetic field sensor, or an annular shaped set of a plurality of magnetic field sensors, or a similar sensor which is capable of sensing the separation between two magnets. Such sensors are made by MTS Systems Corporation. A radial bore 52 is provided in the end piece 18 to accommodate electrical wires to communicate signals from the sensor 50 to the exterior. Alternatively, the sensor 50 can be mounted in a separate ring (not shown) which is mounted on the rod assembly 16.

As best seen in FIG. 3, at one end of the sleeve 24, groove 28 is spaced apart clockwise angularly from groove 30 by an angle of about 90 degrees. As best seen in FIG. 4, at a midpoint of the grooves, the grooves 28 and 30 are spaced apart angularly by an angle of about 180 degrees. As best seen in FIG. 5, at the other end of the grooves, the groove 28 is spaced apart counter-clockwise angularly from groove 30 by an angle of about 90 degrees.

As the rod assembly 16 moves in and out of the housing 12, the relative spacing between the portion of magnets 32 and 34 which are within sensor 50 changes, and in response to this changing separation, sensor 50 generates an output signal which is indicative of the position of rod assembly 16 within housing 12.

This position sensing assembly is relatively insensitive to rotation of the rod assembly 16 because rotation does not change the relative spacing between magnets 32 and 34.

The groove 30 is preferably a uniformly helical groove from one end of the rod assembly 16 to the other end, with the groove ends being angularly offset from each other by no more than a predetermined angle. The helical groove 30 can be offset from the straight-line groove 28 by 45 degrees at one end, and by 225 degrees at the other end to provide a fixed minimum angular separation between the two grooves, but this is not necessary.

If the grooves are formed in the rod instead of the sleeve, then the rod must be made out of non-ferrous material, or if ferrous material, the magnet material must be isolated from the rod material. Alternatively, magnetic material could be deposited on the surface of the rod or on a surface of the sleeve.

With this design, no hole needs to be bored in the rod and the sensor is housed outside of the pressurized chamber of the cylinder. As a result, the sensor does not have to withstand the pressures of a cylinder and rod integrity does not have to be jeopardized by a hole bored down the middle.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A position sensing system comprising:

a first element;

a second element slidable with respect to the first element;

a first groove in the second element, the first groove extending parallel to a central axis of the second element;

a first magnet member mounted in the first groove;

a second groove in the second element, the second groove being helical and being spaced apart from the first groove;

a second magnet member mounted in the second groove; and a magnetic field sensor mounted in the first element, the sensor generating an output signal as a function of a relative distance between the first and second magnet members as the second element moves with respect to the first element.

2. The position sensing system of claim 1, wherein the second element comprises:

a cylindrical shaft; and a hollow cylindrical sleeve mounted over and receiving the shaft, the first and second grooves being formed in an inner surface of the sleeve.

3. The position sensing system of claim 1, wherein:

the second element comprises a cylindrical shaft, and a hollow cylindrical sleeve mounted over and receiving the shaft; and the first element comprises a hollow cylindrical housing having an end piece with a shaft bore extending therethrough, a wall of the bore slidably engaging the sleeve.

4. The position sensing system of claim 3, wherein:

the sleeve and the end piece are formed of non-ferrous material.

5. The position sensing system of claim 3, wherein:

an annular sensor groove is formed in a surface of the shaft bore, the magnetic field sensor being mounted in the sensor groove.

6. The position sensing system of claim 5, wherein:

first and second seal grooves are formed in the surface of the shaft bore on opposite sides of the sensor groove;

a high pressure seal element is mounted in the first seal groove and sealingly and slidably engages an outer surface of the sleeve; and a wiper seal element is mounted in the second seal groove and sealingly and slidably engages an outer surface of the sleeve.

7. The position sensing system of claim 2, wherein:

the sleeve is formed of non-ferrous material.

8. A position sensing system comprising:

a hollow cylindrical housing element;

a shaft element slidably received by the housing element, the shaft element comprising a central shaft and a hollow cylindrical sleeve mounted on the shaft;

a first groove in the sleeve, the first groove extending parallel to a central axis of the shaft;

a first magnet member mounted in the first groove;

a second groove in the sleeve, the second groove being helical and being spaced apart from the first groove;

a second magnet member mounted in the second groove; and a magnetic field sensor mounted in the housing element, the sensor generating an output signal as a function of a relative distance between the first and second magnet members as the shaft moves with respect to the housing element.

9. The position sensing system of claim 8, wherein:

the first and second grooves are formed in an inner surface of the sleeve.

10. The position sensing system of claim 8, wherein:

the housing element comprises an end piece with a shaft bore extending therethrough, a wall of the bore slidably engaging the sleeve.

11. The position sensing system of claim 10, wherein:

the sleeve and the end piece are formed of non-ferrous material.

12. The position sensing system of claim 10, wherein:

an annular sensor groove is formed in a surface of the shaft bore, the magnetic field sensor being mounted in the sensor groove.

13. The position sensing system of claim 12, wherein:

first and second seal grooves are formed in the surface of the shaft bore on opposite sides of the sensor groove;

a high pressure seal element is mounted in the first seal groove and sealingly and slidably engages an outer surface of the sleeve; and a wiper seal element is mounted in the second seal groove and sealingly and slidably engages an outer surface of the sleeve.

14. The position sensing system of claim 9, wherein:

the sleeve is formed of non-ferrous material.

15. A position sensing system comprising:

a first element;

a second element having an axial length and being movable with respect to the first element;

a first magnet member mounted on the second element, the first magnet member extends parallel to a central axis of the second element;

a second magnet member mounted on the second element, the second magnet member being helical and spaced apart from the first magnet member, and a spacing between the magnet members varying as a function of an axial position along the second member; and a magnetic field sensor supported by the first element, the sensor generating an output signal as a function of the spacing between the first and second magnet members as the second element moves with respect to the first element.

16. The position sensing system of claim 15, wherein:

a first groove is formed in the second element, the first groove extending parallel to a central axis of the second element, the first magnet member being mounted in the first groove;

a second groove is formed in the second element, the second groove being helical and being spaced apart from the first groove, the second magnet member being mounted in the second groove.

\* \* \* \* \*